United States Patent
Lessing et al.

(10) Patent No.: US 10,093,023 B2
(45) Date of Patent: Oct. 9, 2018

(54) ENHANCEMENT OF SOFT ROBOTIC GRIPPERS THROUGH INTEGRATION OF STIFF STRUCTURES

(71) Applicant: Soft Robotics, Inc., Cambridge, MA (US)

(72) Inventors: Joshua Aaron Lessing, Cambridge, MA (US); Ryan Richard Knopf, Cambridge, MA (US); Daniel Vincent Harburg, Brookline, MA (US); Carl Everett Vause, Concord, MA (US)

(73) Assignee: SOFT ROBOTICS, INC., Cambridge, MA (US)

(*) Notice: Subject to any disclaimer, the term of this patent is extended or adjusted under 35 U.S.C. 154(b) by 0 days.

(21) Appl. No.: 15/137,356

(22) Filed: Apr. 25, 2016

(65) Prior Publication Data

US 2017/0036355 A1 Feb. 9, 2017

Related U.S. Application Data

(60) Provisional application No. 62/151,775, filed on Apr. 23, 2015.

(51) Int. Cl.
*B25J 15/00* (2006.01)
*B25J 15/12* (2006.01)
*B25J 9/14* (2006.01)

(52) U.S. Cl.
CPC ........... *B25J 15/0023* (2013.01); *B25J 9/142* (2013.01); *B25J 15/12* (2013.01)

(58) Field of Classification Search
CPC ...... F16J 3/048; F16J 3/047; B25J 7/00; B25J 15/0009; B25J 15/00; B25J 15/0023;
(Continued)

(56) References Cited

U.S. PATENT DOCUMENTS 3,981,528 A 9/1976 Andorf et al.
4,815,782 A * 3/1989 Craig ..................... B25J 15/12
294/119.3

(Continued)

FOREIGN PATENT DOCUMENTS

EP 0534778 A2 3/1993
WO 2014/196928 A1 12/2014
(Continued)

OTHER PUBLICATIONS

International Search Report and Written Opinion of PCT/US2016/029131; dated Aug. 8, 2016, 8 pages.

*Primary Examiner* — Stephen A Vu

(57) ABSTRACT

Exemplary embodiments relate to various improvements in soft robotic actuators, and more specifically the integration of stiff or rigid bodies into soft actuators to provide adjustable gripping behaviors. These actuators may be used as robotic end effectors to, for example, automate material handling processes. According to some embodiments, the actuators may be deployed in combination with a static or dynamic rigid structure, such as a rod. The rigid structure may extend beside or within the actuator. Multiple rigid structures may be deployed on the sides of an actuator, or multiple actuators may be deployed on the sides of a rigid structure. In further embodiments, an array or matrix of actuators may be integrated into a rigid structure, providing a low-profile gripper that can be maneuvered into tight spaces.

20 Claims, 15 Drawing Sheets

(58) Field of Classification Search
CPC ... B25J 15/12; B25J 9/142; B66C 1/46; A61F 2/583
See application file for complete search history.

(56) References Cited

U.S. PATENT DOCUMENTS

| | | | |
|---|---|---|---|
| 5,245,885 A * | 9/1993 | Robertson | B25J 15/0009 294/119.3 |
| 5,317,952 A | 6/1994 | Immega | |
| 6,484,601 B1 | 11/2002 | Arrichiello | |
| 7,086,322 B2 * | 8/2006 | Schulz | F15B 15/103 92/42 |
| 7,258,379 B2 * | 8/2007 | Ono | B25J 9/142 294/119.3 |
| 7,617,762 B1 * | 11/2009 | Ragner | F15B 15/103 92/37 |
| 2003/0110938 A1 * | 6/2003 | Seto | B25J 9/142 92/92 |
| 2014/0109560 A1 | 4/2014 | Ilievski et al. | |

FOREIGN PATENT DOCUMENTS

| | | |
|---|---|---|
| WO | 2015/138649 A1 | 9/2015 |
| WO | 2016/044654 A1 | 3/2016 |

* cited by examiner

ENHANCEMENT OF SOFT ROBOTIC GRIPPERS THROUGH INTEGRATION OF STIFF STRUCTURES

RELATED APPLICATIONS

This application claims priority to U.S. Provisional Patent Application 62/151,775, filed on Apr. 23, 2015 and entitled "Enhancement of Soft Robotic Grippers Through Integration of Stiff Structures." The contents of the aforementioned application are incorporated herein by reference.

FIELD OF THE DISCLOSURE

The disclosure relates generally to the field of robotics and particularly to novel soft robotic actuators having integrated stiff or rigid bodies to provide adjustable gripping behaviors.

BACKGROUND

Robotics are used in many industries, such as manufacturing, industrial applications, medical applications, and the like. Soft robotics is a developing area of robotics that provides soft, conformal, and adaptive graspers and actuators to enable robots to interact with objects in a similar manner to a human. In particular, such robots are able to manipulate objects in the same manner as a human hand.

Traditionally, soft robotics have been employed in connection with robotic systems for grasping objects on an assembly line or in a warehouse. For example, if a part is on a shelf, a moving belt, or being moved from a shelf to a belt, an end effector may adapt to picking up the object from various directions, such as a "side pick" or a "top down pick." This same grasper may also adapt to varying objects in each task, just as the human hand can.

DETAILED DESCRIPTION OF THE PREFERRED EMBODIMENTS

Figure 1A:
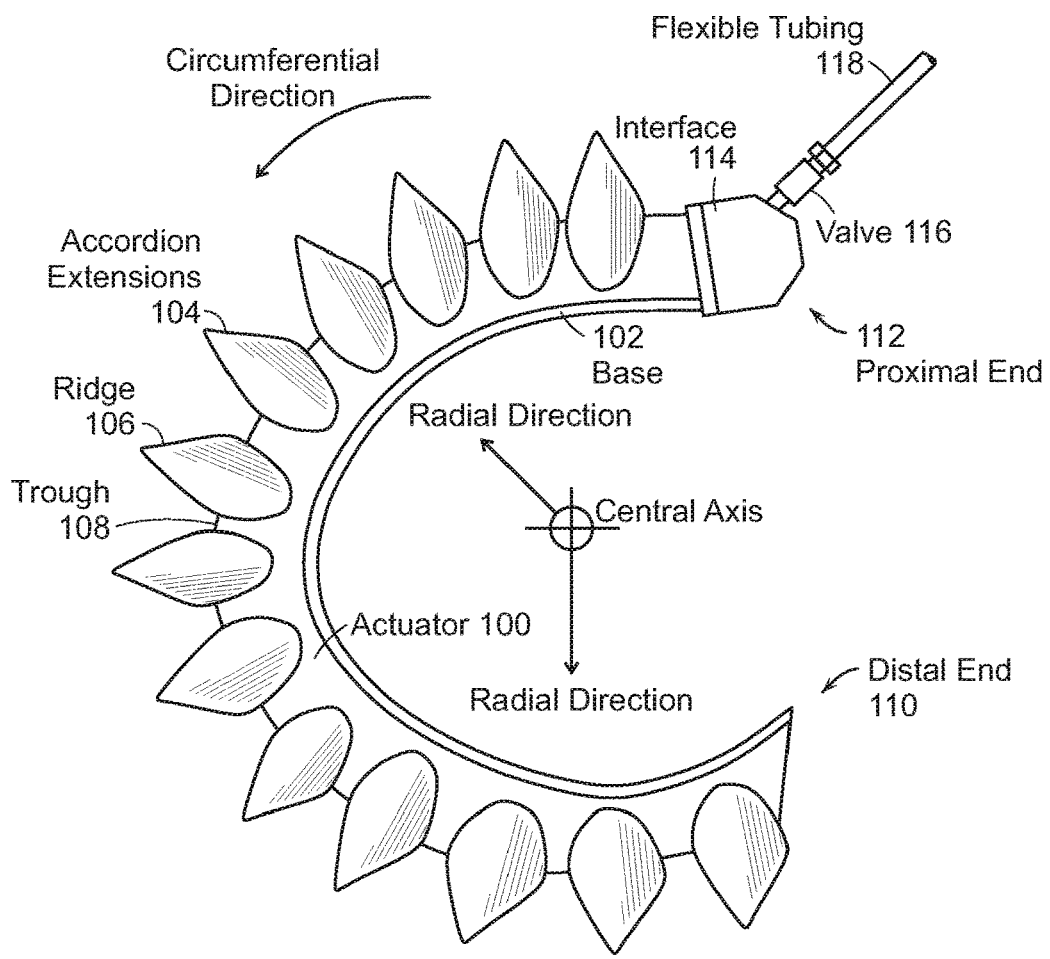
FIGS. 1A-1D depict exemplary soft robotic actuators suitable for use with exemplary embodiments described herein.

Exemplary embodiments provide soft robotic assemblies in which soft actuators are employed in conjunction with rigid structures. The rigid structures may be deployed in proximity to the actuators (e.g., beside the actuators), may be integrated into the actuators, or the actuators may be integrated into the rigid structures. The rigid structures may provide a force that opposes an inflation of at least a portion of the actuator, thereby altering the bending profile of the actuators, or providing reinforcement to (or a leverage point for) the actuators. The rigid structures may, alternatively or in addition, be used to extend the reach of the actuators, or allow the actuators to be retracted into the rigid structures in order to reduce a profile of a robotic gripper, among other possibilities.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold under pressure, or other suitable relatively soft materials. They may be created, for example, by molding one or more pieces of the elastomeric material into a desired shape. Soft robotic actuators may include a hollow interior that can be filled with a fluid, such as air, water, or saline to inflate and actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for new types of motions or combinations of motions (including bending, twisting, extending, and contracting) that can be difficult or impossible to achieve with traditional hard robotic actuators.

Figure 1B:
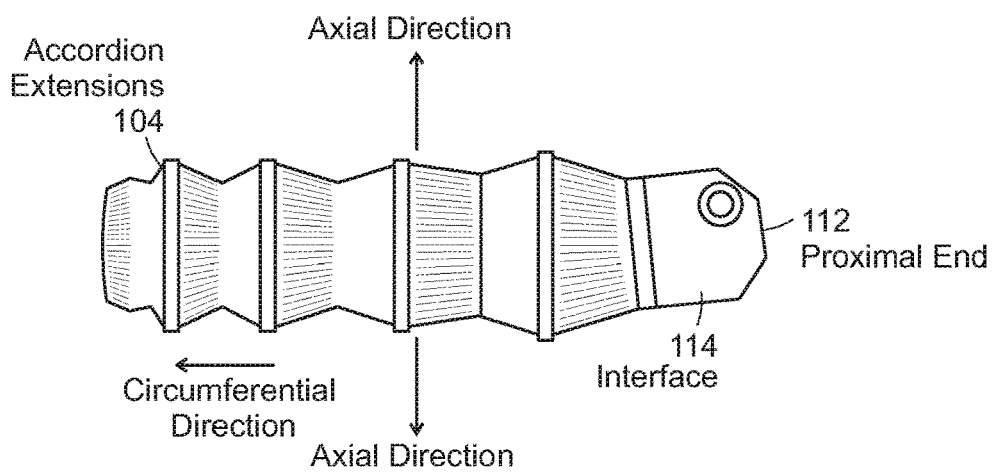
Figure 1C:
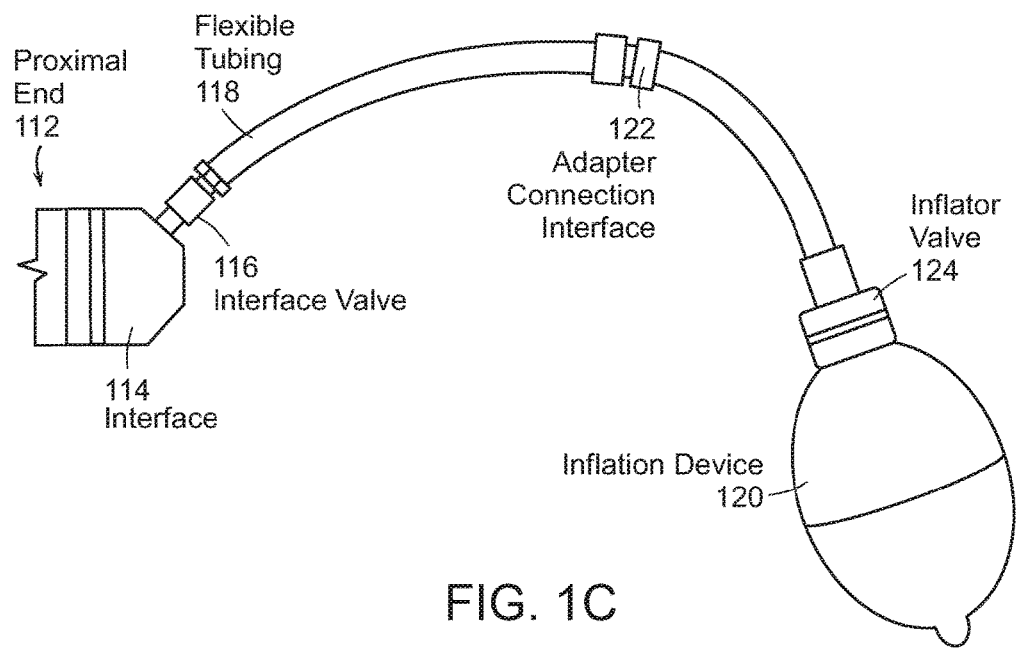
Figure 1D:
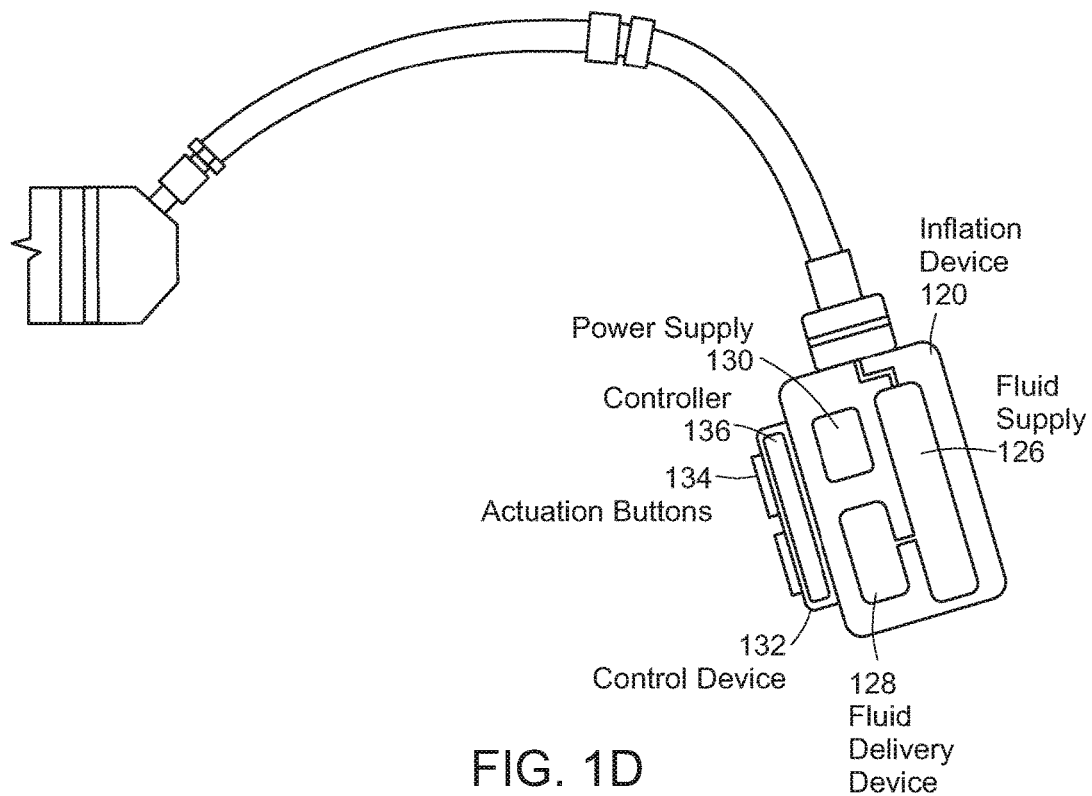

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an incision retractor can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the incision retractor. The interface 114 may be made of a medically safe material, such as Acrylonitrile-Butadiene-Styrene ("ABS") or Delrin. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Soft Robotic Grippers with Integrated Stiff or Rigid Structures

Figure 2C:
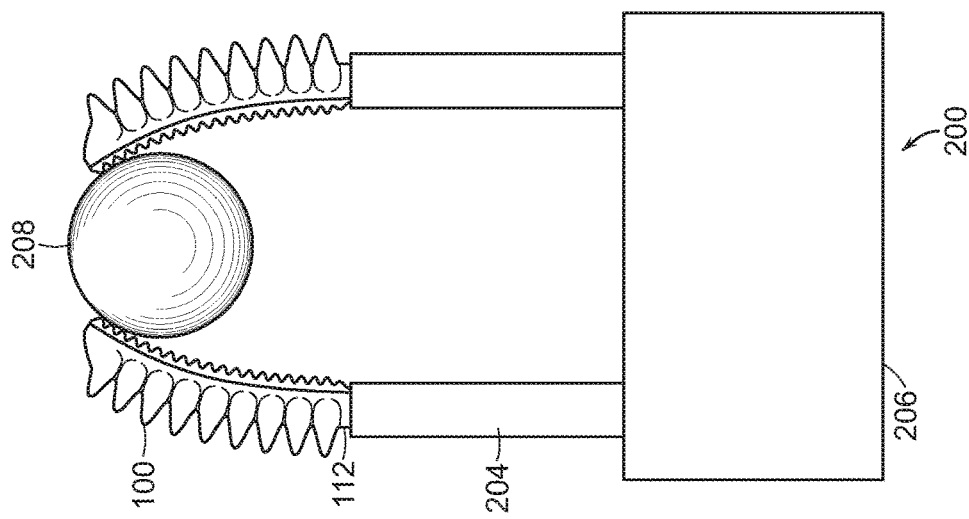
FIGS. 2A-2C depict exemplary soft robotic actuators mounted on the ends of extensible rods.
Figure 2B:
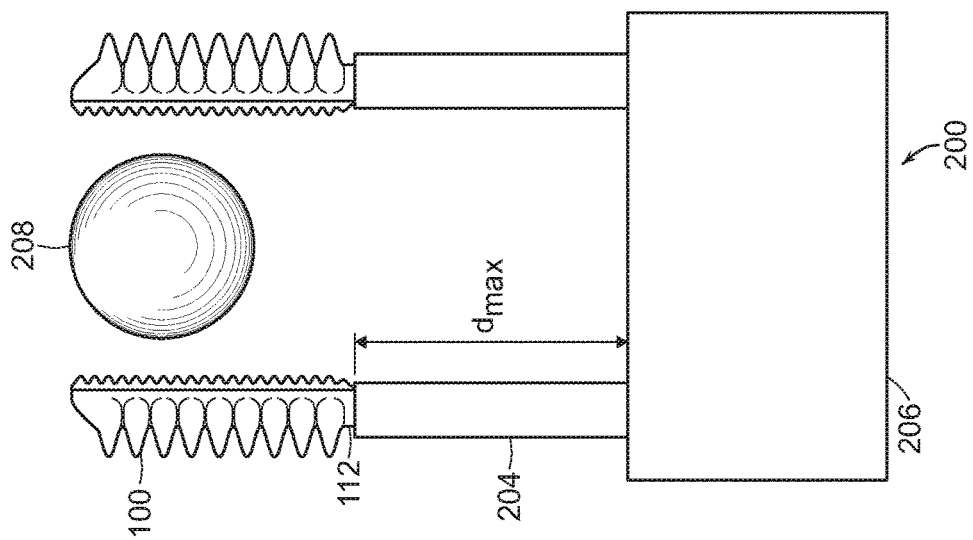
Figure 2A:
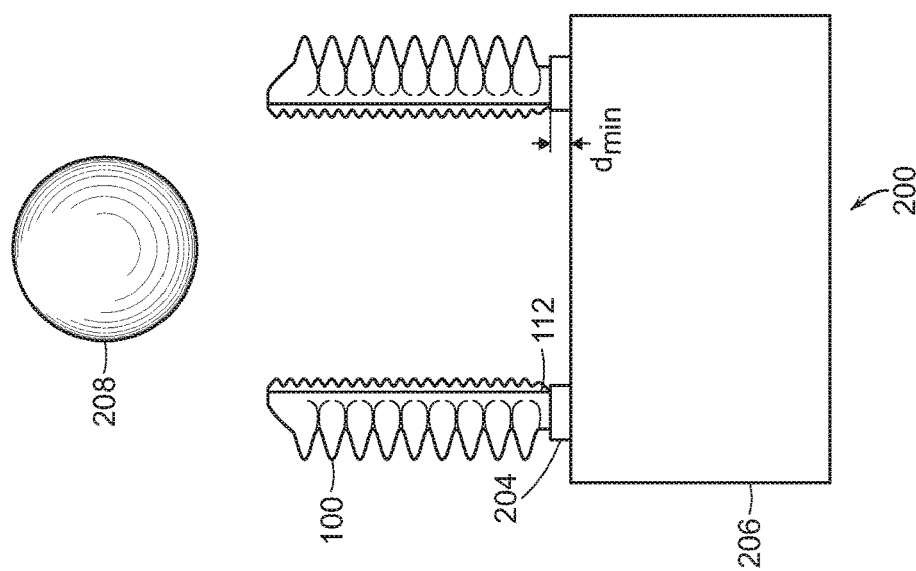

FIGS. 2A-2C depict exemplary soft actuators affixed to the ends of retractable rods. In this configuration, a gripper includes an opposing pair of actuators. The gripper is capable of acquiring objects that are recessed in an enclosure or in a cluttered environment in which a low-profile gripping mechanism is advantageous. This may be useful for gripping objects that are on shelves or in containers such as boxes, for example.

FIG. 2A depicts an exemplary gripper 200 including two actuators 100 on retracted rods 204. In FIG. 2A, the actuators 100 are in an unactuated state. The gripper 200 is configured to grasp a target object 208.

In this example, the actuators 100 are affixed to a base 206 via the rods 204. The rods 204 extend into the base 206, which may include a mechanism for extending the rods (e.g., a mechanical, pneumatic, or hydraulic extension mechanism). The rods 204 are affixed to the actuators 100 at the proximal end 112 of the actuators. The rods 204 may be made of any suitable stiff or rigid material, such as metal or plastic. In exemplary embodiments, the rods 112 may be hollow to provide a passage for supplying an inflation fluid to the actuators 100. Alternatively, the inflation fluid may be supplied to the actuators 100 through separate tubing, in which case the rods may be solid or hollow.

FIG. 2B depicts the exemplary gripper 200 of FIG. 2A after extending the rods 204. In the example of FIG. 2B, the actuators 100 remain in an unactuated state. FIG. 2C depicts the exemplary gripper 200 on extended rods 204, as shown in FIG. 2B, with the actuators 100 in an actuated configuration and gripping the target object 208.

The rods 204 may be configured to extend from a fully retracted configuration, in which the rods 204 extend beyond the base 206 by an amount $d_{min}$ (which may be zero or even negative, in which case the actuators 100 may be allowed to retract into the base 206), to a fully extended configuration, in which the rods 204 extend beyond the base 206 by an amount $d_{max}$. The value of $d_{max}$ may depend on the size of the base 206, although the rods 204 may be allowed to extend through the base 206 and out of the base 206 on a side opposite the actuator 100. The rods 204 may be extended to an intermediate length between $d_{min}$ and $d_{max}$.

The values of $d_{min}$ and $d_{max}$ may be selected depending on the application (e.g., the expected depth of a bin or tote into which the gripper 200 will reach). In some embodiments, the rods 204 may be releasably coupled to the base 206 and/or the proximal end 112 of the actuators 100. Accordingly, the rods 204 may be readily swapped for other rods, to allow the values of $d_{min}$ and $d_{max}$ to be adjusted on-the-fly.

Figure 3A:
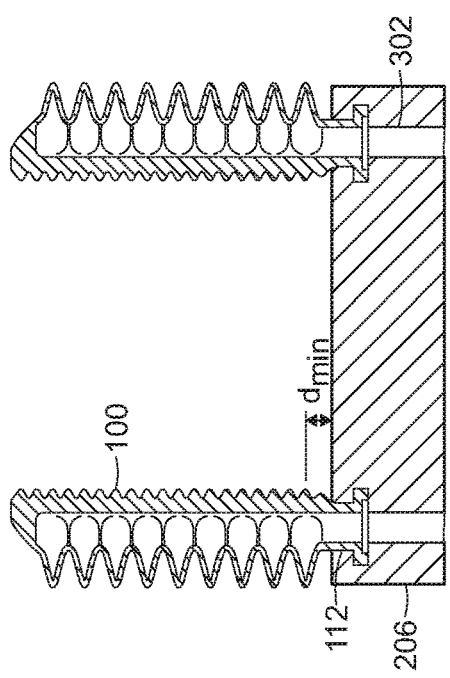
FIGS. 3A-3C depict exemplary soft robotic actuators having extensible rods incorporated into their internal structure.
Figure 3C:
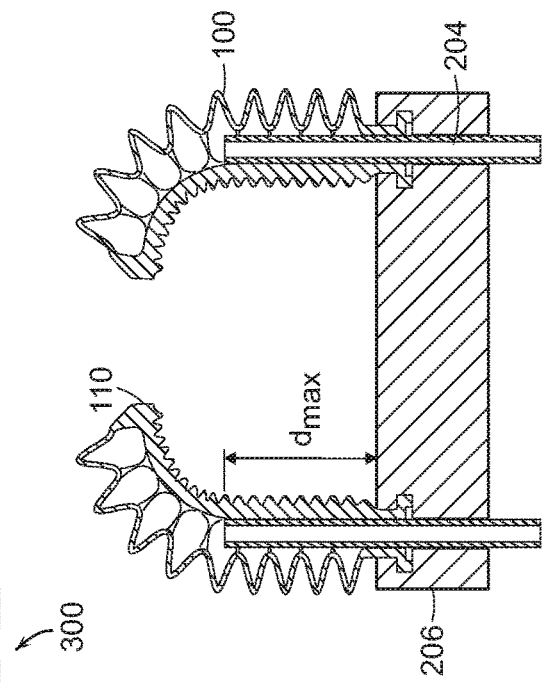
Figure 3B:
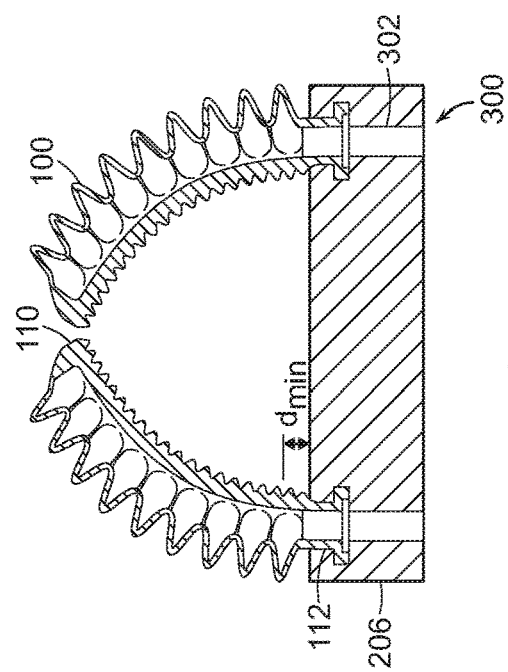

FIGS. 3A-3C depict examples in which stiff or rigid objects are incorporated into the interior of a soft actuator to change the actuator's inflation profile. FIG. 3A depicts a cross-section of an exemplary gripper 300 having two unactuated actuators 100, whereas FIG. 3B depicts a cross section of the gripper 300 with actuated actuators 100. In these examples, the proximal end 112 of the actuators 100 extends a short distance into the base 206, although in other embodiments the proximal end 112 may be mounted on top of the base 206.

In FIGS. 3A and 3B, a passage 302 is provided in the base 206 for each actuator 100. Rods 204 may be located in the passage 302, and may extend from an unextended state (in which case the rods 204 extend into the actuator 100 by an amount $d_{min}$, which may be zero, or may not extend into the actuator 100 at all) to an extended state (in which case the rods 204 extend into the actuator 100 by an amount $d_{max}$, as shown in FIG. 3C).

FIG. 3C depicts a cross section of the gripper of FIG. 3A after the insertion of the rods 204 into the interior of the actuators 100 and the inflation of the actuators 100. Note the changed inflation profile as compared to FIG. 3B. By inserting the rods 204 into the actuators 100, the amount of material that is allowed to flex at the distal end 110 of the actuator 100 is reduced (the remainder of the actuator closer to the proximal end 112 being restricted from flexing due to the presence of the rod 204). This restriction changes the inflation profile of the actuator 100, dependent on the length of the rigid material inserted into the actuator 100.

Whereas a configuration such as the one depicted in FIG. 3B might be well-suited to grasping relatively small objects using the distal tips 110 of the actuators 100, or for grasping an object along an entire length of the actuators 100, a configuration such as the one depicted in FIG. 3C may be well suited to grasping relatively larger objects using the distal tips 110 of the actuators 100, or for grasping an object using the unrestricted length of the actuator 100 above the height $d_{max}$.

In some embodiments, the rods 204 may be static objects that are in a fixed position. In other embodiments, the rods 204 may be retractable so that the length of the rigid material inserted into an actuator 100 may be adjusted on demand (to a value anywhere between $d_{min}$ and $d_{max}$).

FIGS. 4A-4G depict exemplary soft actuators abutted by hard objects in order to augment the behavior of the actuators. For example, a hard object can be used to adjust the actuator's inflation profile, make it easier to maneuver a gripper (e.g., including a pair of opposed actuators) into tight spaces, provide a leverage point for an actuator, and reinforce an actuator so that it does not deflect past the position of the hard object when the actuator is under load. Moreover, by placing a hard object on the exterior side of the actuator, the hard object can restrict the actuator from moving past the hard plate prior to or during inflation. This allows the gripper to be maneuvered into locations (e.g., the interstitial gaps between adjacent objects in a tote or bin) very precisely, without colliding with or shifting the other items in the bin or tote.

Figure 4A:
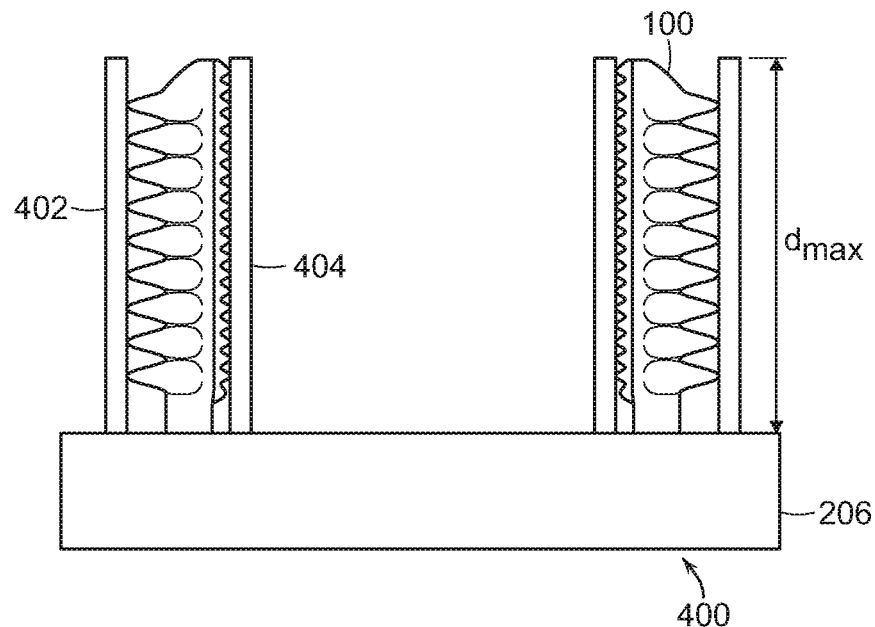
FIGS. 4A-4G depict exemplary configurations in which pairs of extensible rods are placed in proximity to an actuator.

FIG. 4A depicts an exemplary unactuated gripper 400 with fully extended hard plates 402, 404 that abut the actuators. The hard plates include an exterior plate 402 that abuts the accordion side of the actuator 100 and an interior plate 404 that abuts the base side of the actuator 100. In this configuration, the hard plates 402, 404 are fully extended from the base 206, out to the length $d_{max}$. This configuration may be used, for example, to maneuver the gripper 400 in a tight space prior to actuation.

Figure 4B:
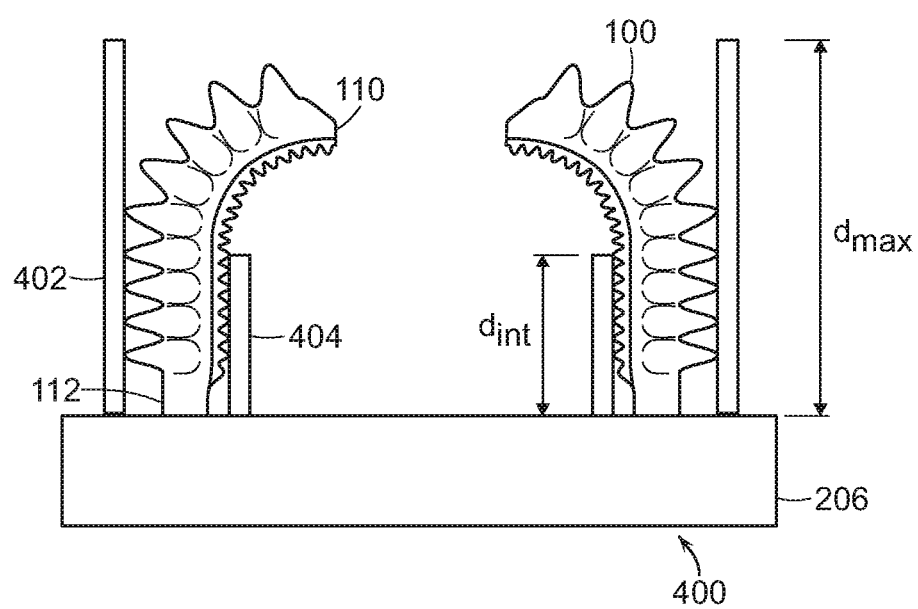

FIG. 4B depicts an exemplary actuated gripper 400 with fully extended exterior hard plates 402 on the accordion faces of the actuators 100, and partially extended interior hard plates 404 on the opposite side of the actuators 100. The partially extended interior hard plates 404 are extended to a length $d_{int}$ representing an intermediate value between $d_{min}$ and $d_{max}$. Here the exterior plates 802 on the accordion side of the actuators 100 may prevent the actuators 100 from being deflected past the plane of the exterior plates 402 when the actuator 100 is under load. The interior plates 404 on the opposite side of the actuators 100 may be used to modify the bending profile of the actuators 100.

Figure 4C:
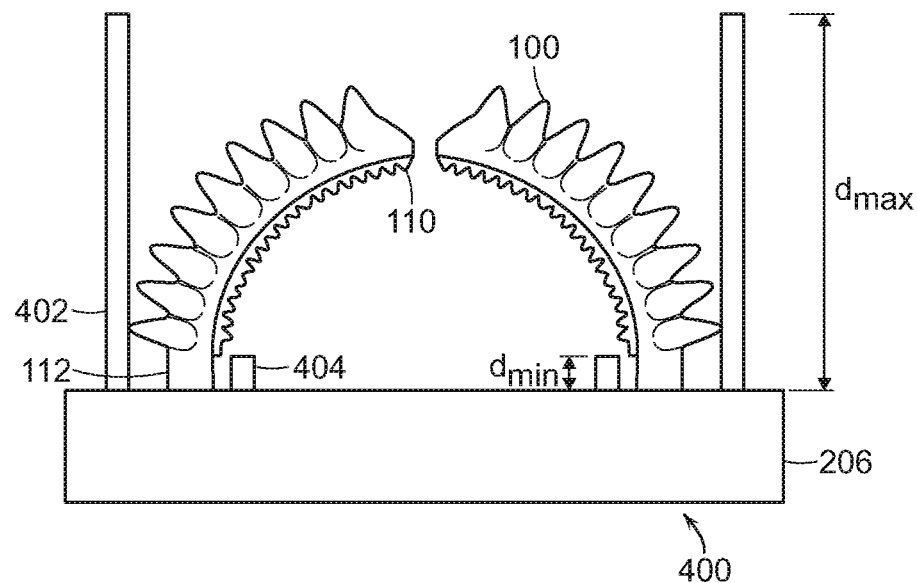

FIG. 4C depicts an exemplary actuated gripper 400 with fully extended exterior hard plates 4020 on the accordion face of the actuators 100 and fully retracted interior hard plates 404 on the opposite side of the actuators 100. Fully retracting the interior plates 404 on the opposite side of the actuators 100 from the accordion faces allows the actuators 100 to bend without alteration of the inflation profile.

Figure 4D:
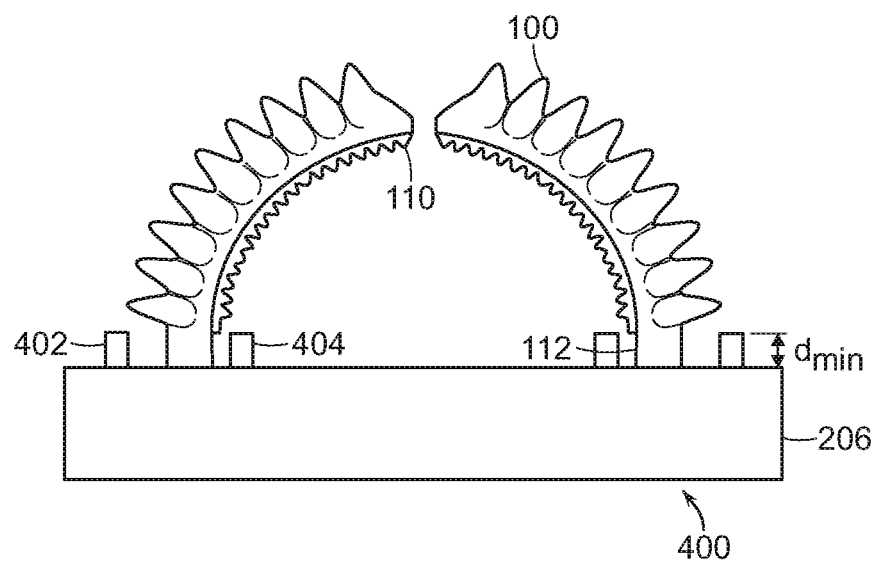

FIG. 4D depicts an exemplary actuated gripper 400 with fully retracted exterior hard plates 402 on the accordion faces of the actuators 100 and fully retracted interior hard plates 404 on the opposite side of the actuators 100.

The hard plates 402, 404 may be static objects that are in a fixed position, or they may be retractable so that the length of material can be adjusted on demand. Although the hard material in FIGS. 4A-4D is depicted as plates 402, 404, other hard structures (e.g., circular, triangular, and rectangular tubes) may also be suitable for use with exemplary embodiments.

Figure 4E:
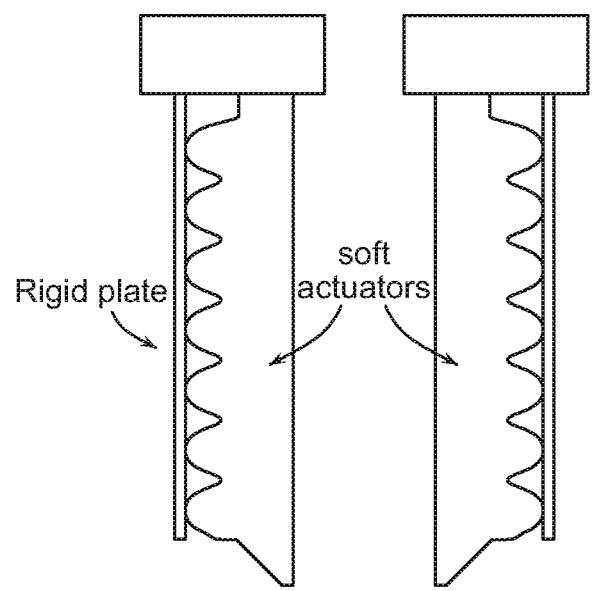
Figure 4F:
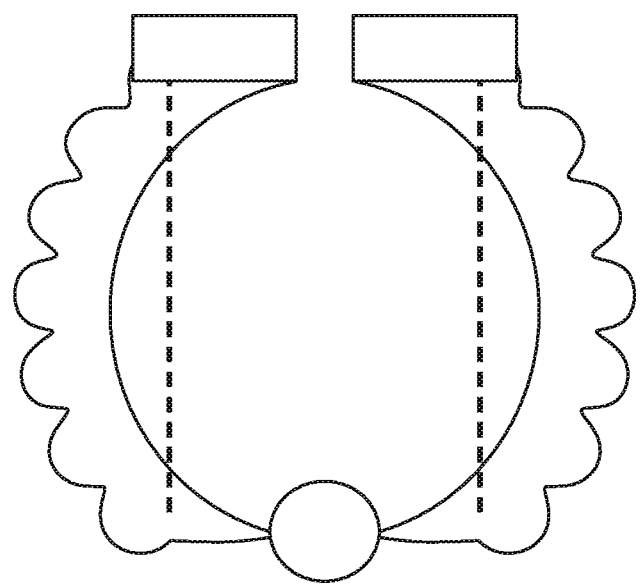
Figure 4G:
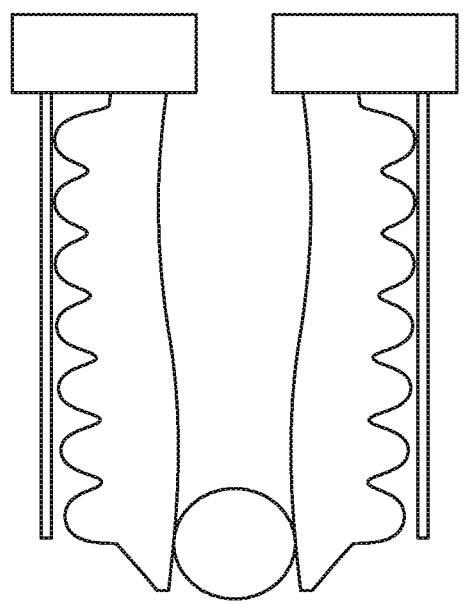

The mechanism of action is shown for the hard plate on the accordion face of the actuator in FIGS. 4E, 4F, and 4G. FIG. 4E depicts an unactuated gripper with a hard backing plate. When the actuators are inflated, they will exhibit a tendency to curve, as shown in FIG. 4F (in which the hard plate is absent but the location at which the hard plate would be located is depicted in dashed lines). The presence of the hard plate, as in FIG. 4G, causes the actuated gripper to press against the plate, preventing the actuated gripper from extending beyond the plane of the plate while still allowing the actuator to actuate and grip a target.

Figure 5C:
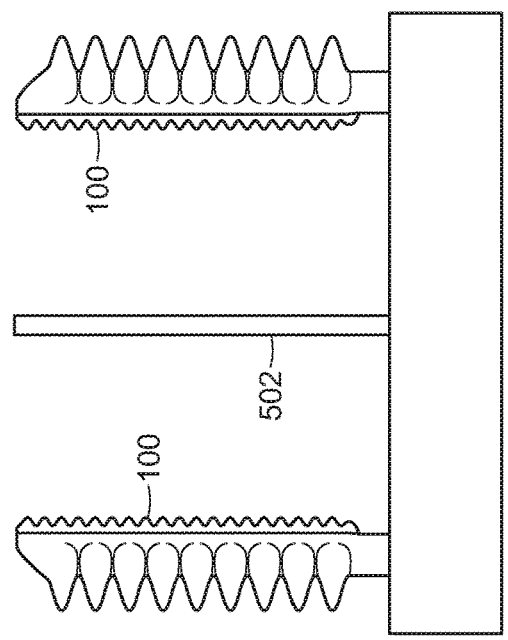
FIGS. 5A-5C depict configurations of actuators and rods suitable for grasping various types and numbers of objects.
Figure 5B:
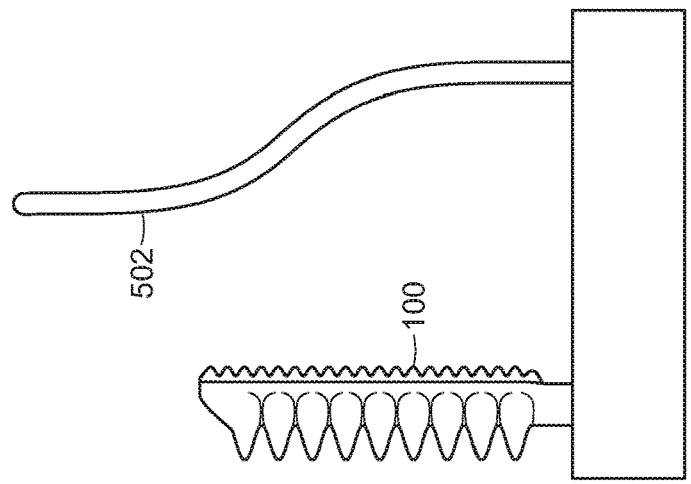
Figure 5A:
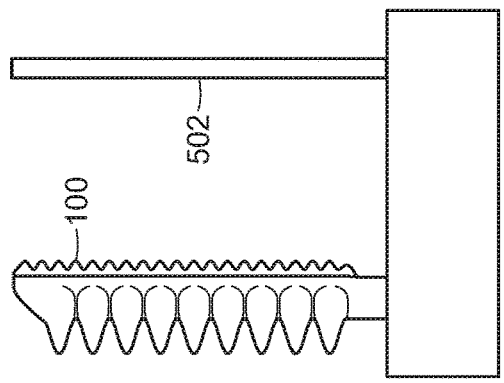

FIGS. 5A-5C depict another example in which a rigid body 502, such as a rod, opposes a soft actuator 100. The rigid body 502 may provide a leverage point against which the actuator 100 can push a target object.

FIG. 5A depicts a configuration in which the rigid body 502 is straight; however, the rigid body 502 can take a wide variety of shapes (e.g., to conform to the profile of a target object to be grasped. For example, FIG. 5B depicts an s-curve shaped rigid body 502. Furthermore, multiple actuators 100 and/or rigid bodies 502 may be employed, as shown for example in FIG. 5C. In this configuration, two actuators 100 flank a rigid body 502 in order to grasp two or more target objects simultaneously.

Figure 6C:
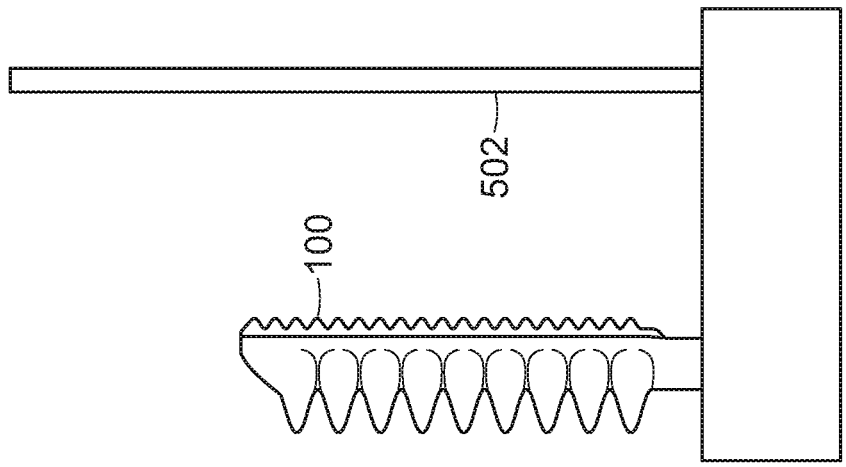
FIGS. 6A-6C depict an actuator opposing an extensible rod.
Figure 6B:
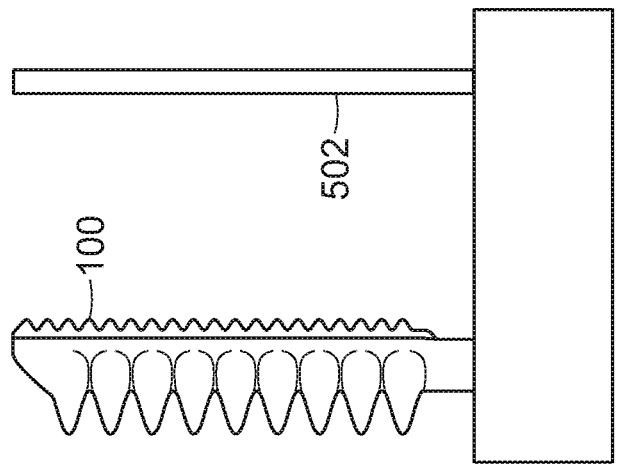
Figure 6A:
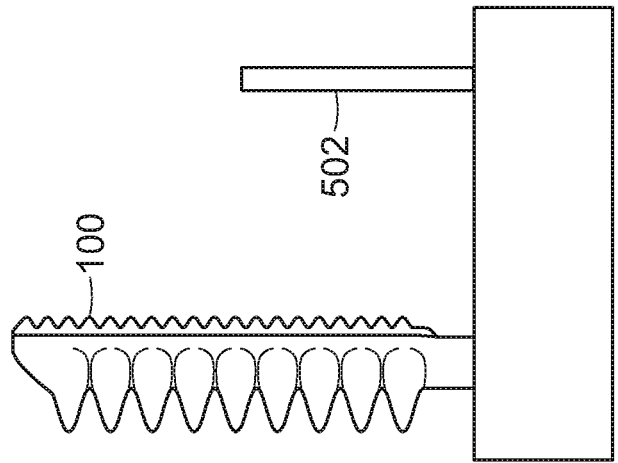

FIGS. 6A-6C provide further examples of a rigid body 502 opposing a soft actuator 100 to adaptively grasp objects. In these examples, both the rigid body 502 and the soft actuator 100 can be repositioned quickly to change the grasp profile. FIG. 6A depicts a rigid body 502, in the form of a telescoping rod, in an unextended position. FIG. 6B depicts the rod partially extended, and FIG. 6C depicts the rod fully extended. The extension of the rod allows the configuration of the gripping structure to be modified.

Figure 7A:
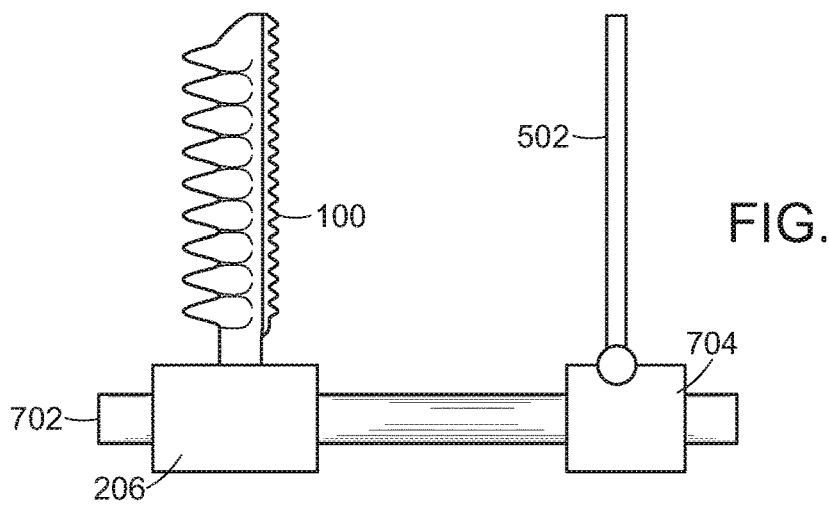
FIGS. 7A-7C depict an example of an adjustable actuator and rod system.
Figure 7B:
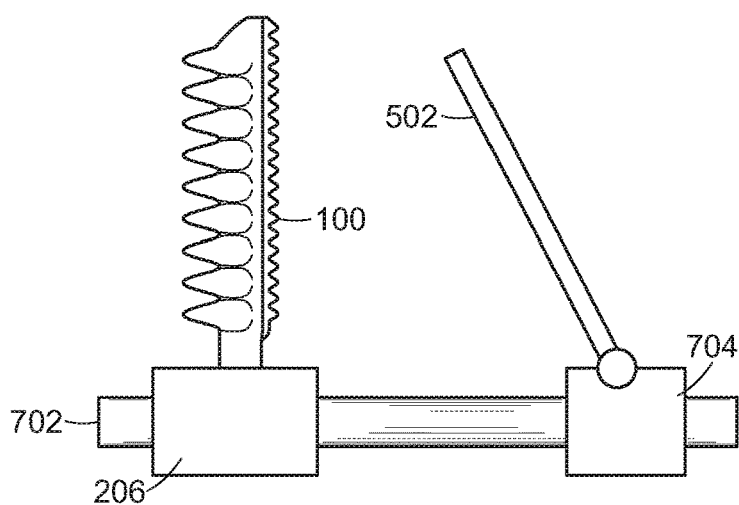
Figure 7C:
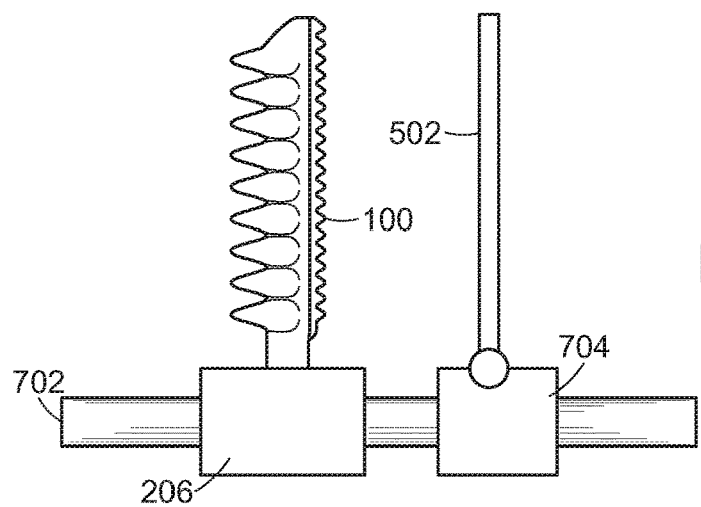

FIGS. 7A-7C show how the spacing and angle between the rigid body 502 and the soft actuator 100 can be adjusted dynamically (e.g., through the use of mechanical gears, working fluids, etc.). The actuator 100 is mounted to a base 206, which is slidably affixed to a rail 702 or beam. The base 206 may be slid laterally along the rail 702 and locked in place. Similarly, the rigid body 502 is mounted to a second base 704 that is slidably mounted on the rail 702. At the point at which the rigid body 502 connects to the second base 704, a hinge or other rotation mechanism is provided allowing the angle between the rigid body 502 and the rail 702 to be adjusted. The bases 206, 704 and the hinge may be manually adjusted, or may be mechanically adjusted (e.g., using a gearing mechanism, an actuator, etc.). Adjusting one or several of the bases 206, 704 and the hinge allows an operator to quickly tune the resulting grip profile when the soft actuator is pressurized. For example, FIG. 7B depicts a configuration in which the rigid body 502 has been rotated about the hinge to change an angle between the rigid body 502 and the rail 702. FIG. 7C depicts an example in which one or both of the bases 206, 702 have been slid along the rail 702 towards each other and locked into place.

Figure 8A:
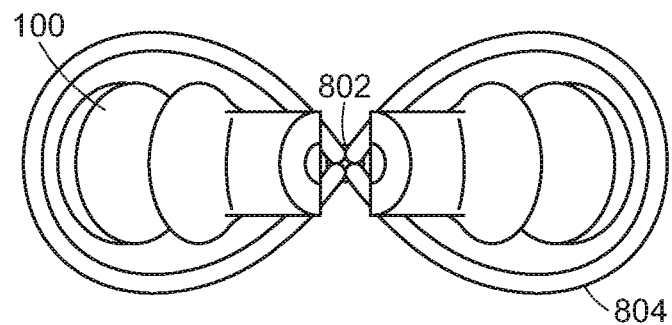
FIGS. 8A-8B depict an example of a robotic gripper employing an adjustable reinforcement band.
Figure 8B:
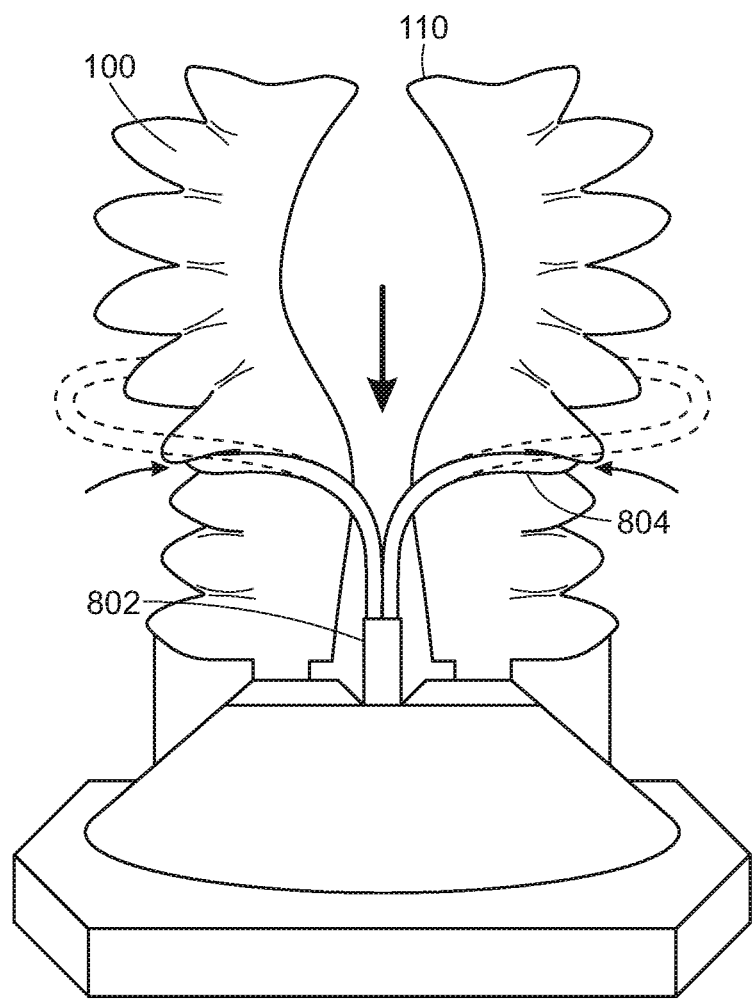

FIGS. 8A-8B depict a structure and technique for rapidly adjusting a leverage point for a soft actuator (FIG. 8A is a top view, and FIG. 8B is a side view). As shown in FIG. 8B, a retractable rod 802 centered between two actuators 100 is free to move up or down, and a cable 804 may be cinched to reposition reinforcements at any accordion of the actuator 100. This allows for dynamic adjustment for the inflation profile of a soft actuator 100 and the delivered normal force at the distal tips 110 of the actuators 100.

Soft Actuators Integrated into a Rigid Body

A rigid body, such as a plate or panel, may serve as a structural support for an array of soft actuators that are integrated into the rigid body. This enables a gripping structure to achieve a very small profile that can be used to grasp objects that are closely spaced or near the edge of a box, bin, tote, or container. The rigid body serves as a conduit for a working fluid to flow to each actuator to pressurize or depressurize the chambers. When pressurized, the actuators extend beyond the solid body to provide a soft grip on an object. The hard member can be built in any geometry such as a paddle, panel, rod, strut, post, etc., and can be composed of a metal, plastic, rubber, glass, ceramic, or any other suitable material. The rigid body provides mechanical and pneumatic/hydraulic support for each actuator in the array. This design can be used for a variety of applications, including picking stacked objects out of a box or tote that are positioned near the edge of the box or tote.

Figure 9:
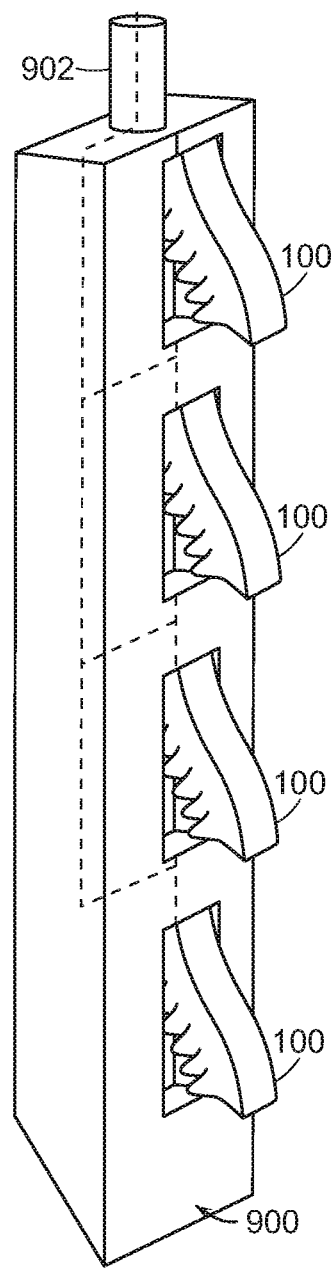
FIG. 9 depicts an example of an actuator array integrated into a rigid structure.

FIG. 9 depicts an exemplary rigid structure 900 into which soft actuators 100 have been integrated. The structure 900 may take the form of a panel, plate, rod, strut, paddle, finger, or any other rigid structure. One or more working fluid lines 902 run through the rigid structure 900 to pressurize the actuators 100. The actuators 100 may be recessed into the structure 900 to achieve a minimal profile under neutral or negative pressures. In some embodiments, the structure 900 may support three or more actuators 100.

Figure 10D:
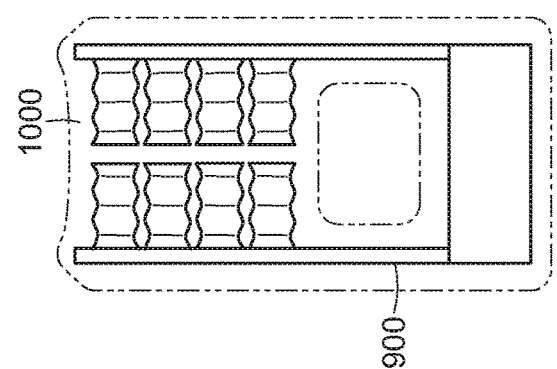
FIGS. 10A-10D depict examples of actuators integrated into rigid structures in unactuated and actuated states.
Figure 10C:
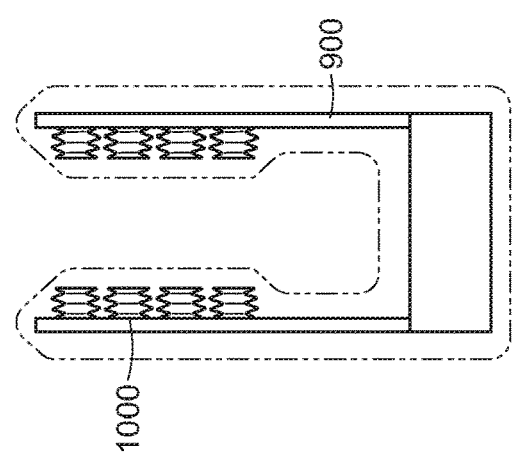
Figure 10B:
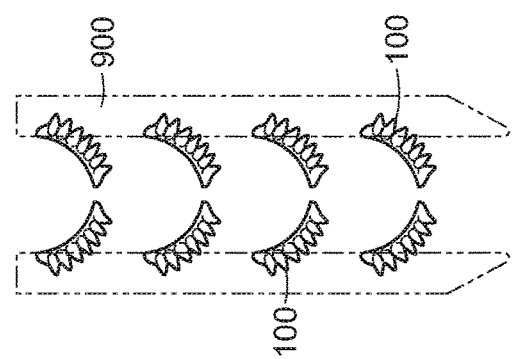
Figure 10A:
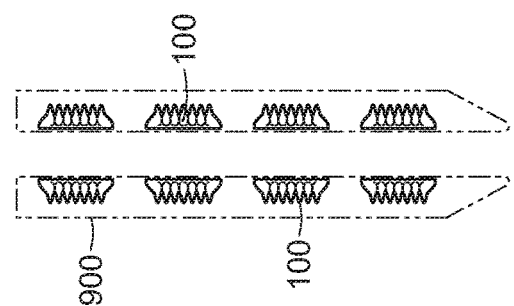

FIGS. 10A-10D depict inflation profiles for soft actuators 100, which bend or linearly extend, integrated into rigid structures 900. Each actuator 100 may be addressed individually, as a group, or in any combination. For these purposes, different combinations of fluid lines may be used to supply inflation fluid to predetermined groups of actuators 100. FIG. 10A depicts a series of actuators 100 at neutral or negative pressure recessed into the structure 900. FIG. 10B depicts the actuators 100 of FIG. 10A at a positive pressure, causing the actuators 100 to inflate. FIG. 10C depicts linear actuators 1000 at a negative pressure. FIG. 10D depicts the linear actuators 1000 of FIG. 10C at a positive pressure.

Figures 11A, 11B:
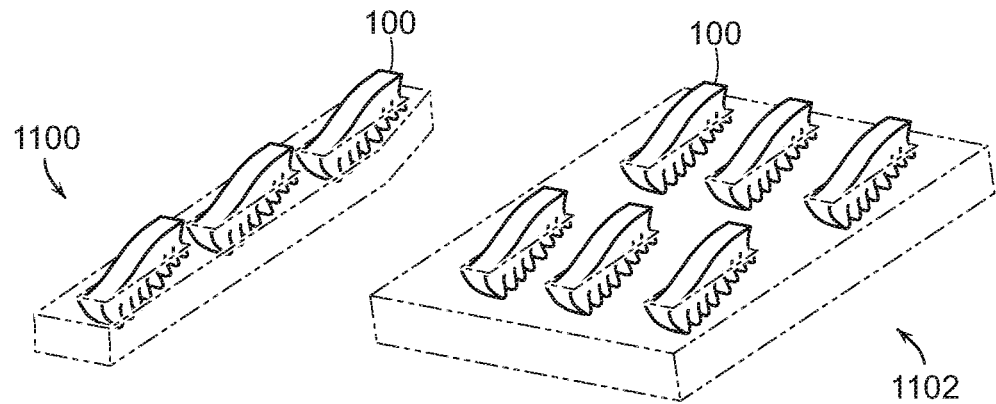
FIGS. 11A-11B depict examples of actuators arranged into an array and a matrix on rigid structures.

FIGS. 11A-11B depict arrays 1100 and matrices 1102 of soft actuators 100 that are constructed to handle different objects. Depending on the application, the actuators 100 may be arranged into an array 1100 or a matrix 1102 in order to better grasp a target object. The rigid structure supporting the actuators 100 may be sized and shaped to maintain the actuators 100 in a desired configuration.

Figures 12A, 12B, 12C:
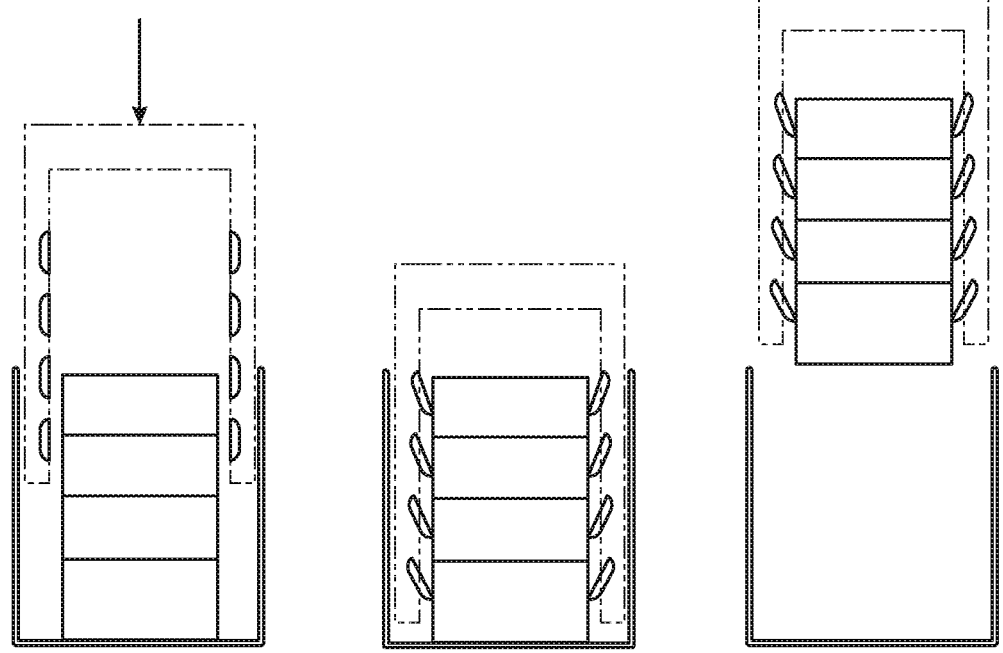
FIGS. 12A-12C depict an exemplary robotic gripper including arrays of actuators integrated into rigid structures.

FIGS. 12A-12C depict a rigid body with integrated soft actuators, similar to the ones depicted in FIGS. 10A and 10B, which achieves a small profile such that the construct can be used to manipulate and grasp objects in tight spaces. As shown in FIG. 12A, the body is first lowered into a box, tote, or bin. The actuators may be pressurized, as shown in FIG. 12B. The object may then be removed from the bin, as shown in FIG. 12C. The object may also be placed into a bin by running this process in reverse.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the present invention has been disclosed with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof.

The invention claimed is:

1. A robotic gripper comprising:
   a base;
   a soft robotic actuator directly or indirectly mounted to the base, the soft robotic actuator comprising a hollow body including an elastomeric material, the hollow body configured to accept an inflation fluid and extending lengthwise in a longitudinal direction from a proximal end adjacent to the base to a distal end opposite the proximal end, wherein
      the base extending the length of the actuator in the longitudinal direction and forming a gripping surface, and
      an outer side comprising a plurality of accordion extensions, the outer side extending the length of the actuator in the longitudinal direction and disposed opposite the base across an internal void in the hollow body; and
   a first rigid body mounted in or on the base and performing one or more of:
      extending a portion of the length of the soft robotic actuator from the base towards the distal end of the actuator without encompassing the distal end, the first rigid body disposed:
         within the internal void,
         adjacent to the base of the actuator along the portion of the length of the actuator, or
         adjacent to the outer side of the actuator along the portion of the length of the actuator,
      wherein the first rigid body is configured to provide a force opposing an inflation of the soft robotic actuator along the portion of the length; or
      configured to move the soft robotic actuator from a first distance with respect to the base to a second distance from the base, the second distance being longer than the first distance in the longitudinal direction.

2. The gripper of claim 1, wherein the first rigid body is statically fixed to the base.

3. The gripper of claim 1, wherein the first rigid body is extensible.

4. The gripper of claim 1, wherein the first rigid body extends internally in the base.

5. The gripper of claim 1, wherein the first rigid body extends internally within the actuator.

6. The gripper of claim 1, wherein the first rigid body is disposed adjacent to the actuator.

7. The gripper of claim 1, comprising a second rigid body, wherein the two rigid bodies are disposed on opposing sides of the actuator.

8. The gripper of claim 7, wherein the first rigid body is of a fixed size, and the second rigid body is extensible.

9. The gripper of claim 7, wherein the first rigid body and the second rigid body are both of a fixed size.

10. The gripper of claim 7, wherein the first rigid body and the second rigid body are each extensible.

11. The gripper of claim 1, wherein the first rigid body has a predetermined shape or configuration that is configured to conform to a target object to be grasped.

12. The gripper of claim 1, wherein the soft robotic actuator is a first soft robotic actuator, and further comprising a second soft robotic actuator, wherein the first rigid body is disposed between the first soft robotic actuator and the second soft robotic actuator.

13. The gripper of claim 1, wherein a distance between the actuator and the first rigid body is adjustable.

14. The gripper of claim 1, wherein an angle between the first rigid body and the base is adjustable.

15. The gripper of claim 1, further comprising a reinforcement cable extending from the first rigid body, wherein the reinforcement cable is configured to be affixed between two accordion extensions of the soft robotic actuator.

16. A robotic structure comprising:
   a rigid body;
   an array or matrix of two or more soft robotic actuators, the soft robotic actuators comprising a hollow body including an elastomeric material, the hollow body configured to accept an inflation fluid, wherein the actuators are capable of moving between an uninflated state and an inflated state and, in the uninflated state, extend lengthwise in a longitudinal direction from a proximal end adjacent to the base to a distal end opposite the proximal end, the soft robotic actuator further comprising a base extending the length of the actuator in the longitudinal direction and forming a gripping surface, and an outer side comprising a plurality of accordion extensions, the outer side extending the length of the actuator in the longitudinal direction and disposed opposite the base across an internal void in the hollow body; and
   a fluid supply line provided in the rigid body configured to supply the inflation fluid to the array or matrix of actuators, wherein
   each of the two or more soft robotic actuators is mounted to the rigid body such that, in the uninflated state, at least a portion of the outer side of the actuator is recessed within the rigid body and, in the inflated state, the portion of the outer side extends beyond the rigid body.

17. The robotic structure of claim 16, wherein the soft robotic actuators are recessed into the rigid body when in a negatively-actuated state.

18. The robotic structure of claim 16, wherein the fluid supply line supplies the inflation fluid to all of the actuators of the array or matrix so that the actuators are actuated as a group.

19. The robotic structure of claim 16, wherein the fluid supply line is configured to provide inflation fluid separately to different actuators so that the actuators are actuated individually.

20. The robotic structure of claim 16, wherein the fluid supply line is configured to actuate a subset of the array or matrix of actuators so that the subset of actuators is inflated as a group.

* * * * *